(12) United States Patent
Tryggvason (10) Patent No.: US 6,954,698 B2
(45) Date of Patent: Oct. 11, 2005

(54) SYSTEM AND METHOD FOR SURVEYING UNDERGROUND DENSITY DISTRIBUTIONS

(75) Inventor: Bjarni V. Tryggvason, Ancaster (CA)

(73) Assignee: Gedex Inc., Mississauga (CA)

( * ) Notice: Subject to any disclaimer, the term of this patent is extended or adjusted under 35 U.S.C. 154(b) by 286 days.

(21) Appl. No.: 10/607,302

(22) Filed: Jun. 27, 2003

(65) Prior Publication Data

US 2004/0000910 A1 Jan. 1, 2004

Related U.S. Application Data

(60) Provisional application No. 60/392,025, filed on Jun. 28, 2002.

(51) Int. Cl.$^7$ .................................................. G01V 7/16
(52) U.S. Cl. ........................ 702/5; 73/382 G; 324/331
(58) Field of Search ................. 702/2, 5, 11; 73/382 G; 703/6, 10; 324/330, 331

(56) References Cited

U.S. PATENT DOCUMENTS

| | | | | |
|---|---|---|---|---|
| 5,402,340 A | * | 3/1995 | White et al. .................... | 702/5 |
| 5,878,356 A | * | 3/1999 | Garrot et al. ................... | 701/1 |
| 6,152,226 A | * | 11/2000 | Talwani et al. .......... | 166/252.4 |
| 6,212,952 B1 | * | 4/2001 | Schweitzer et al. ....... | 73/382 G |

* cited by examiner

*Primary Examiner*—Donald McElheny, Jr.
(74) *Attorney, Agent, or Firm*—George A. Seaby (57) ABSTRACT

A method for geographical surveying includes the steps of determining an observation grid comprising observation points above a solution volume in the ground; making gravitational measurements at the observation points over a survey area; compiling a matrix having elements relating a set of gravitational accelerations and gravity gradient values at the points to the mass values for volume elements in the solution volume; and calculating the three-dimensional density distribution of the volume under the survey area based on the gravitational measurements and the inverse of the matrix. By measuring the magnetic field and gradient at the observation points, the three-dimensional magnetic susceptibility distribution of the volume under the survey area can be determined.

19 Claims, 7 Drawing Sheets

| Solution Plane | Grid Dimension (m) | Depth to Grid Midpoint (m) | Number of Grid Points per Plane |
|---|---|---|---|
| 1 | 100 | 50 | 22500 |
| 2 | 150 | 175 | 10000 |
| 3 | 200 | 350 | 5625 |
| 4 | 300 | 600 | 2500 |
| 5 | 300 | 900 | 2500 |
| 6 | 500 | 1300 | 900 |
| 7 | 600 | 1850 | 625 |
| 8 | 750 | 2525 | 400 |
| 9 | 1000 | 3400 | 225 |
| 10 | 1500 | 4650 | 100 |
| 11 | 1500 | 6150 | 100 |
| 12 | 2500 | 8150 | 36 |
| 13 | 5000 | 11900 | 9 |

SYSTEM AND METHOD FOR SURVEYING UNDERGROUND DENSITY DISTRIBUTIONS

REFERENCE TO RELATED APPLICATIONS

This Application claims benefit from the provisional application No. 60/392,025 filed Jun. 28, 2002.

FIELD OF THE INVENTION

This invention relates to the field of geophysical surveying, and more particularly to the use of gravitational or magnetic sensors to obtain a three-dimensional picture of subsurface resources below a survey area.

BACKGROUND OF THE INVENTION

Gravitational potential is the potential energy associated with a body that has mass. The gravitational potential obeys the principle of superposition: the gravitational potential of a collection of masses is the sum of the gravitational potentials of the individual masses. Therefore a measurement of the gravitational potential field is fundamentally a measure of the composite (additive) contributions from the mass distribution within a detectable range. The gravitational potential at a point near a gravitating body can be measured by observing the acceleration that the potential field causes on a test body, if the test body is unconstrained, i.e., if the test body is allowed to accelerate freely within the potential field. Alternatively the test body can be prevented from accelerating freely by applying a restraining force on the test body, for example through a physical spring. Using Newton's second law, the force required to restrain the test body and the mass of the test body can be used to determine the acceleration that would be observed if the test body were free to accelerate. In geophysics the term gravimeter is used for the class of instruments used to measure the gravitational acceleration to the high resolution and accuracy required for geophysical work. Since the gravitational potential field, and hence the gravitational acceleration field, depends only on the mass distribution, it is in principle possible to determine characteristics of the mass distribution through a series of measurements taken at numerous locations. However, there are several shortcomings in the use of such surveys, as described in greater detail below.

In addition to measuring the gravitational acceleration, it is also possible to measure directly at an observation point, the spatial variation in the gravitational acceleration, i.e. to measure the rate of change in the gravitational acceleration with position. The rate of change in the gravitational acceleration with change in spatial location is termed the gravity gradient. As is the case for the gravitational acceleration, in principle the mass distribution can be determined from a survey of the gravity gradient. As will be shown, there are practical advantages to using the gravity gradient for determining the mass distribution compared to using the gravitational acceleration. Gravity gradiometers have been and are used in geological surveys to measure gravity gradients as an aid to locating anomalies in the gravitational field that may be indicative of commercially valuable resources, such as minerals, precious metals and gems and oil and gas fields.

As is commonly known, the gravitational potential field at a point depends on the summed effect of all gravitating bodies and is generally characterized by the acceleration that the gravitational potential field causes on a test body. The test body is typically sized such that its mass is very small, in the limit zero, compared to the mass of the bodies causing the acceleration. The gravitational acceleration can be measured using any one of a number of existing sensors. The relationship between the gravitational acceleration and the mass of the body, or bodies, causing the acceleration was first defined by Sir Isaac Newton more than three hundred years ago. As determined by Newton, the gravitational acceleration due to a body is given by:

$$a(r) = \frac{G * M}{r^2} \tag{1}$$

where a is the acceleration at distance, r, from the center of mass of the gravitating body, M is the mass of the gravitating body, and G is the universal gravitational constant. This equation shows that the observed gravitational acceleration decreases with the square of the distance from the center of mass of the gravitating body. This equation holds for the acceleration due to a large, perfectly spherical body, in which case the acceleration will be directed towards the center of mass of the body which for a spherical body of uniform density will coincide with the geometric center of the body. At a point outside the surface of a large body such as the Earth, M would be the total mass of the-body, and r is the distance from the center of mass of the body. If r is smaller than the radius of the spherical body, then the mass to be considered will be the mass inside a sphere of radius r.

For a body that is not of uniform density, the gravitational acceleration is given by:

$$a(x, y, z) := \int \int \int G \cdot \frac{\rho(X, Y, Z) \cdot r}{(|r|)^3} dXdYdZ \tag{2a}$$

$$r := (x-X) \cdot i + (y-Y) \cdot j + (z-Z) \cdot k \tag{2b}$$

where the a(x,y,z) is the acceleration vector, determined at location (x,y,z) at the point of observation or measurement, ρ(X,Y,Z) is the mass density, which, in general depends on the position (X, Y, Z) within the gravitating body, r is the vector between observation point (x,y,z) and position (X, Y, Z) within the gravitating body, and i, j, and k are the unit vectors. The integrals are evaluated to include the whole volume of the gravitating body. While the contribution to the acceleration made by each infinitesimally small volume will be directed towards that volume, that is along the vector r from the observation point to the center of mass for that volume, the total acceleration at a point (x,y,z) will, in general, not be directed towards the center of mass of the entire body which, in turn, will not necessarily coincide with the geometric center as defined by the surface bounding the whole body. This is due to the r squared dependence of the acceleration, which gives greater weight to mass elements that are closer to the point at which the acceleration is determined than for mass elements that are further away.

For large gravitating bodies such as the Earth, the center of mass will be close to the geometric center. However, even when the center of mass of a body such as the Earth is coincident with its geometric center, the slight bulge of the Earth at the equator compared to the poles produces an acceleration that is not directed towards the center of mass of the Earth, except at points that are either directly over the poles or directly over the equator. This, again, arises from the r squared relationship. Hence if the gravitational acceleration is determined with respect to a coordinate system defined with respect to the geometric shape of the Earth, the gravitational acceleration will have three components, a large component directed towards the geometric center, because the geometric center is close the center of mass, and small components in the two other orthogonal directions.

As indicated by equations (2a) and (2b) above, the gravitational acceleration depends on the distribution of mass throughout the body. Therefore, in principle, it is possible to determine the density distribution of a large body by measuring the acceleration at a great number of points outside the surface of the body. For example, the acceleration of satellites orbiting the Earth can be observed using ground based optical or radio telescopes. This approach has been used to map the gravitational acceleration field of the Earth and to identify anomalies related to mass anomalies, and similarly, the motions of satellites around the Moon have been used to determine the acceleration field of the Moon and to identify mass anomalies within the Moon. The satellite observations have been used to determine variations in the Earth's acceleration field and to refine the geode models over spatial scales from approximately 100 km and greater. Since satellites typically orbit at altitudes that are several hundred km above the Earth's surface, it is not practically possible to determine variations at smaller scales.

Because of the r squared dependence, near the surface of the Earth, variations in the gravitational acceleration can be detected and related to the detailed distribution of density near the surface. The gravitational acceleration due to the mass contained within a small volume of the Earth near the Earth's surface, which is given by the density times the volume, decreases as the square of the distance from that volume element. While the gravitational acceleration is always dependent on the integral over the complete volume, variation in the acceleration field near the surface will be related primarily to density variation just below the surface. Therefore, these variations can, in principle, be used to infer the density distribution just below the surface.

The equations previously referred to provide a direct means for determining the acceleration field, that is a(x,y,z), given the description of the three dimensional density field, $\rho(X,Y,Z)$. This is termed the forward calculation, and, if the distribution of the density is known, is straightforward. Inverting this calculation, that is determining the three dimensional density distribution from a measured acceleration field, requires solving equation (2a) above for the density given the variation of the acceleration a(x,y,z). While this is in principle possible, equation (2a) is what is known as an integral equation, and it is generally recognized as being a much more challenging problem. For practical applications, equation (2a) above can be approximated using a finite difference approach as follows:

$$a(x, y, z) := \sum_i \sum_j \sum_k G \cdot \frac{\rho(X_i, Y_j, Z_k) \cdot r}{(|r|)^3} \cdot \Delta X_i \cdot \Delta Y_j \cdot \Delta Z_k \quad (3a)$$

$$r := (x-X_i) \cdot i + (y-Y_j) \cdot j + (z-Z_k) \cdot k \quad (3b)$$

Thus, the integral equation of (2a) is approximated by discrete summation equation (3a). In this form, the summations are made over the complete volume, i.e. the summation is carried out over all volume elements. $\Delta X_i$, $\Delta Y_j$, $\Delta Z_k$ are the dimensions of the individual volume elements. In general, the volume elements will differ in size and accordingly the subscripts i, j and k are used in equations (3a) and (3b) to label the volume elements. The mass of each volume element is equivalent to its volume multiplied by its average density: $\rho(i,j,k)$ $\Delta X_i \Delta Y_j \Delta Z_k$. The size of the volume elements used to model a given total volume, Will affect the accuracy in the determination of the acceleration, with a large number of small elements providing better accuracy than fewer large elements. This forward calculation of the acceleration field from the density can be done easily for any selected point (x,y,z), and is straightforward. Although it typically requires a large amount of computation, this is well within the capability of existing computer technology.

The inverse calculation required to determine the density distribution from the acceleration field is a much more complex computation. There are a number of problems inherent in the approaches that have been attempted to date. The first is that the inversion can be done uniquely only if it is done completely. In other words, a unique inversion is possible only if the density structure is determined for the whole volume that contributes to the observable variations in the gravitational field parameters, i.e., to the variations in the localized gravitational field. The second problem is related to resolution. While it is theoretically possible to perform an inversion to any desired resolution, in practice the resolution is limited by the accuracy and resolution of the measured accelerations. This is a factor in the issue of uniqueness, as the limit in the resolution can be used to limit the volume that needs to be included in the inversion, and allows for defining the solution resolution in such a way that a unique solution is possible.

Any inversion algorithm will result in a set of simultaneous equations that need to be satisfied. It is fundamental that a set of equations can be solved uniquely only if the number of unknowns that need to be determined are equal in number to or fewer than the number of independent observations related to the unknowns. There is a further restriction if there is significant noise in the measurements of a(x,y,z). Noise in the measurements will reduce the resolving power of any instrument, requiring a large number of additional measurements and use of statistical techniques in the inversion. Due to these factors, potential field inversion algorithms in use to date cannot provide a unique inversion because they typically do not properly match the definition of the volume elements to the instrument resolution and do not match the number of independent observations to the number of volume elements.

To date, practitioners have attempted to overcome these limitations by incorporating additional information, typically from other types of measurements (e.g. seismic surveys, magnetometer surveys, etc.). While other types of data can provide additional constraints to assist in the inversion, fundamentally data of another type, i.e. not directly related to density, are not applicable. It is only the density structure that comes into play in setting the gravitational field. No other measurable properties or parameters come into play, as is clear from equations (1) and (2). For example, there is no direct connection between magnetic fields and gravitational fields, and only an indirect connection between seismic data and gravitational data that depends on the relation between seismic wave velocities and density, which is not a unique relationship. All of the above limitations have limited the success of current approaches to the inversion of gravitational data.

SUMMARY OF THE INVENTION

According to one aspect, the invention provides a surveying method for determining the subsurface density distribution at a selected resolution for a solution volume below a survey area using an airborne or other type of vehicle containing gravitational sensors for measuring the gravitational acceleration and the gravity gradients, said gravitational sensors having predetermined resolution, the method comprising the steps of:

(a) determining the size of the volume elements at various depths within the solution volume based on the selected density resolution, the height of the gravity survey and the predetermined sensor resolution such that the volume of the volume elements times the density resolution equals mass anomalies that are all within the predetermine detector resolution;

(b) determining an observation survey grid above the solution volume comprising observation points, the number of said observation points being sufficient to perform the determination of the subsurface density distribution;

(c) compiling a matrix having elements that relate the gravitational acceleration and gravity gradient values to the mass values of the volume elements; the matrix entries depend on the geometries between the location of the volume elements within the solution volume and the location of the observation points within the observation survey grid;

(d) moving the vehicle along a path of travel over the survey area such that the gravity sensors make gravitational measurements at said observation points within the observation survey grid; and (e) based on the gravitational measurements and the inverse of the matrix, calculating values which represent the average density of the volume elements.

According to another aspect, the invention provides a surveying method for determining the three-dimensional, subsurface magnetic susceptibility at a selected resolution for a solution volume beneath a survey area using an airborne or other vehicle containing a magnetic sensor having a predetermined resolution for measuring the magnetic field comprising the steps of:

(a) determining the size of volume elements at various depths within the solution volume based on a selected magnetic resolution, the height of the magnetic survey and the predetermined sensor resolution;

(b) preparing an observation survey grid above the solution volume comprising observation points, the number of observation points being sufficient to perform the determination of subsurface magnetic susceptibility distribution;

(c) compiling a matrix having entries dependent on the geometries between the location of volume elements within the solution volume and the location of the observation points in the observation survey grid;

(d) moving the vehicle along a path of travel over the survey area such that the magnetic sensors make magnetic field measurements at said observation points within the observation survey grid; and (e) based on the magnetic field measurements and the inverse of the matrix, calculating values which represent the volume magnetic susceptibility of the volume elements.

In another aspect, the invention provides a surveying system for determining the subsurface density distribution at a selected resolution of a solution volume below a survey area, said system comprising:

(a) an airborne or other type of vehicle containing gravitational sensors for measuring the gravitational acceleration and the gravity gradients, said gravitational sensors having a predetermined resolution;

(b) a volume determining module for determining the size of the volume elements at various depths within the solution volume based on the selected density resolution, the height of the gravity survey and the predetermined sensor resolution such that the volume of the volume elements multiplied by the density resolution equals mass anomalies that are all within the predetermined sensor resolution;

(c) an observation survey grid module for defining an observation survey grid above the solution volume comprising observation points, the number of said observation points being sufficient to perform the determination of the subsurface density distribution, such that when the vehicle is flown along a flight path the gravitational sensors are adapted to make measurements of the gravitational acceleration and the gravity gradient at said observation points within the observation survey grid over the survey area at selected altitudes;

(d) a matrix module for compiling a matrix having elements that relate the gravitational acceleration and gravity gradient values measured by the gravity sensors to the mass values of the volume elements; the matrix entries depend on the geometries between the location of the volume elements within the solution volume and the location of the observation points within the observation survey grid; and (e) a calculation module for calculating values which represent the average density of the volume elements based on the gravitational acceleration and the gravity gradients and the inverse of the matrix.

DETAILED DESCRIPTION OF THE INVENTION

Figure 1:
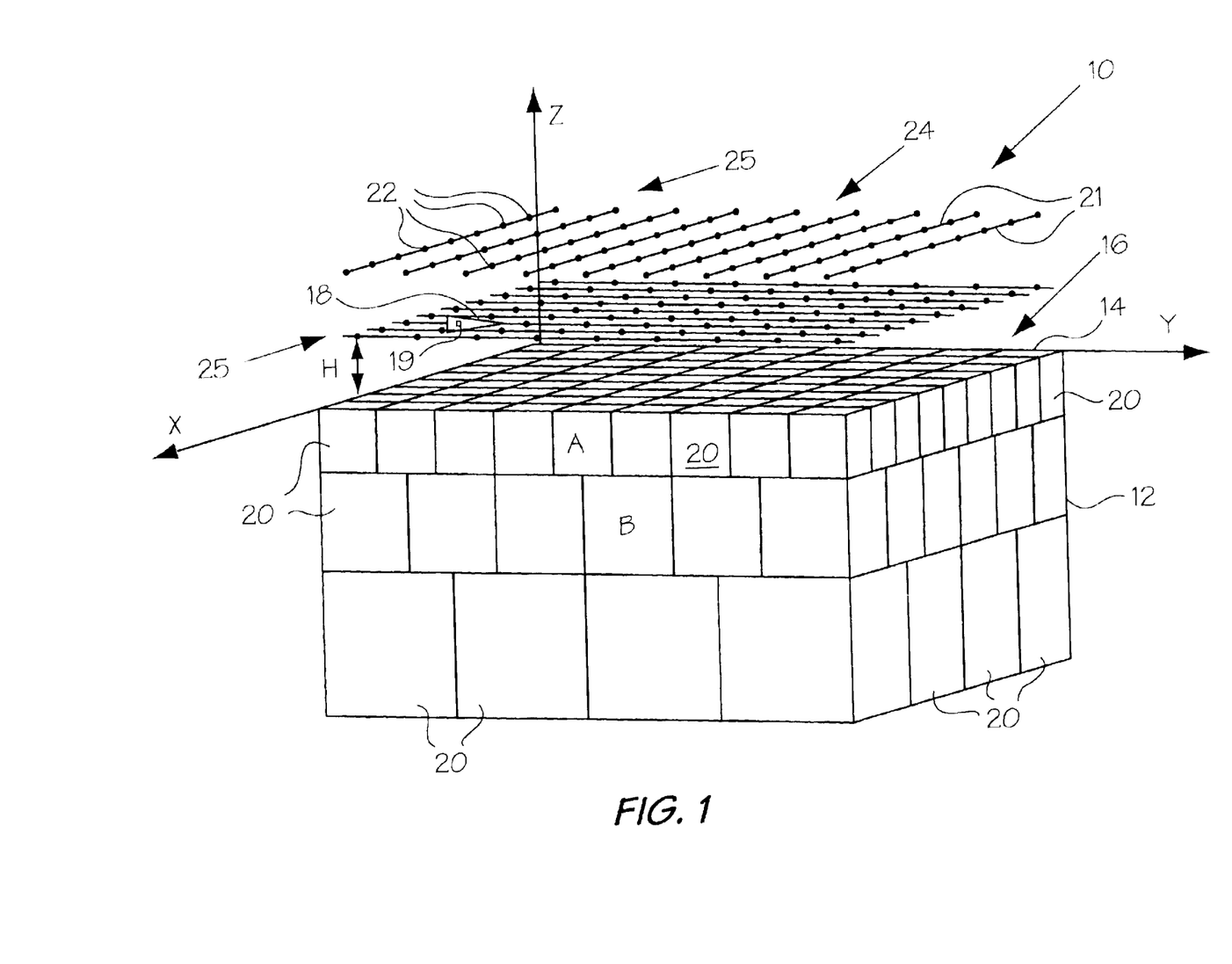
FIG. 1 is a schematic diagram of an exemplary survey site to illustrate the survey system and method of the present invention.
Figure 2:
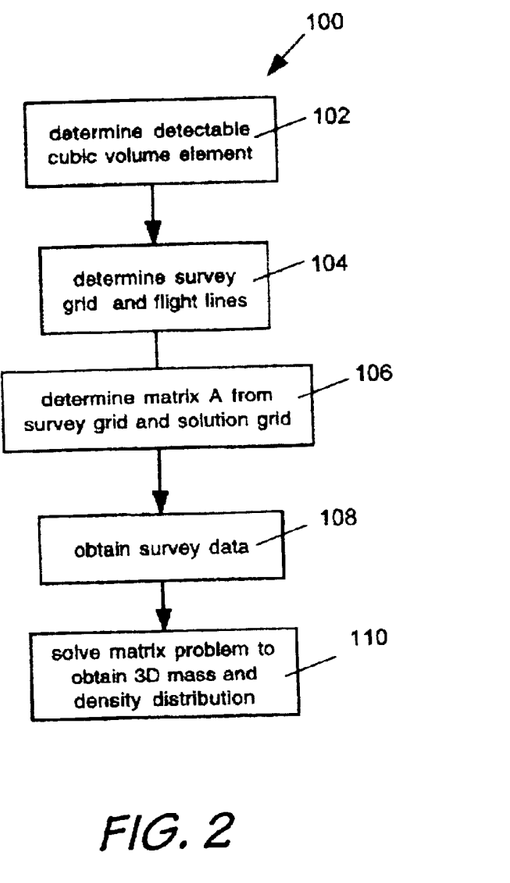
FIG. 2 is a flowchart illustrating the general process steps of the survey method of the present invention.

FIGS. 1 and 2 illustrate a physical survey system 10 (FIG. 1) and the general process steps 100 of the survey method (FIG. 2) of the present invention. The survey method is used to determine the three dimensional density structure of the subsurface material 12 below a survey area 14. Survey vehicles 18 (one shown-FIG. 1) travel over the survey area 14, which overlies a three-dimensional solution volume 16. The three-dimensional density structure of the region within the solution volume 16 is determined from data obtained from gravitational sensors 19 located on a survey vehicle 18 which traverses predetermined flight lines 21. The survey vehicle 18 obtains gravitational data at observation points 22 within a survey grid 24 which typically consists of a plurality of observation planes 25. It should be noted that the area covered by the survey grid 24 should be similar to the survey area 14 overlying the solution volume 16.

The solution volume 16 shown in FIG. 1 consists of a plurality of cubic volume elements 20 (e.g. A and B) which are configured within the solution volume 16 such that each volume element 20 generates an observable variation in the gravitational acceleration and in the gravity gradient above the survey area 14. The gravitational acceleration and gravity gradients are respectively measured by a gravimeter (e.g. having a 1 mgal resolution) and a gravity gradiometer (e.g. having a 1 Eotvos (Eo) resolution) flown at a particular height above the survey area 14 (e.g. 300 meters) along survey flight lines 21 (e.g. 15 km in length with a line to line spacing of 100 m), the measurements being taken at various survey or observation points 22 along the survey line (e.g. 100 m spacing), the observation points forming the survey grid 24 at various observation planes 25. As shown, the cubic volume elements 20 increase in size as the depth increases, i.e. volume element B is larger than volume element A. It will be appreciated that the solution volume, its volume elements, and the survey grid shown in FIG. 1 provides only one possible example of how the system could be configured.

FIG. 2 is a flowchart of the main process steps 100 used in the survey method of the present invention to determine the three-dimensional density structure of the subsurface material within the solution volume 16 (FIG. 1). The five main process steps shown in FIG. 2 are a detectable volume element determination stage 102, an observation survey grid determination stage 104, a matrix calculation stage 106, a data gathering stage 108, and a solution stage 110. Each step is described in detail below. The following description of conventional gravitational geophysics will facilitate an understanding of the main process steps 100.

As described above, gravitational geophysics makes use of measured variations in the gravitational field of the Earth. Gravitational acceleration (g) is a vector quantity with components in the three principle directions of interest ($g_x$, $g_y$, $g_z$). Accordingly, each component of the gravitational acceleration can vary with position, where the position can change in each of three directions, namely x, y, and z. The gradient ($G_{ij}$) of gravitational acceleration is therefore a tensor with nine components, known as the gravity gradient tensor:

$$[Gij] := \begin{pmatrix} \frac{\partial g_x}{\partial x} & \frac{\partial g_y}{\partial x} & \frac{\partial g_z}{\partial x} \\ \frac{\partial g_x}{\partial y} & \frac{\partial g_y}{\partial y} & \frac{\partial g_z}{\partial y} \\ \frac{\partial g_x}{\partial z} & \frac{\partial g_y}{\partial z} & \frac{\partial g_z}{\partial z} \end{pmatrix}$$

where i, j=x, y, z independently, yield nine gradient elements ($G_{xx}$, $G_{xy}$, $G_{xz}$, $G_{yx}$, $G_{yy}$, $G_{yz}$, $G_{zx}$, $G_{zy}$, $G_{zz}$). Here the subscripts x and y represent the two principal directions in the horizontal plane (e.g., east-west and north-south), while z is the vertical direction. As is conventionally known the gravity gradient tensor is symmetric and the trace satisfies the Laplace equation. Hence, only five of the components are independent, for example $G_{xy}$, $G_{xz}$ and $G_{yz}$ (because $G_{ij}=G_{ji}$) and any two of $G_{xx}$, $G_{yy}$ and $G_{zz}$ since the three diagonal terms are related through the Laplace equation, $G_{xx}+G_{yy}+G_{zz}=0$. Therefore the nine component gravity tensor is completely defined by just five independent components.

The unit commonly used in geophysics for the gravitational acceleration is the "gal" where 1 gal=1 cm/sec$^2$. In other fields, it is common to use the unit g=9.81 m/s$^2$. Converting between the units is straightforward. At the surface of the Earth, the vertical component of the gravitational acceleration due to the mass of the whole Earth is 1 g (9.81 m/s$^2$) which is equivalent to 981 gal. In practice, gravimeters used in geophysical work usually operate within a noise envelope of 0.01 mgal (+/−0.01 mgal), which is approximately one ten-millionth of the Earth's background gravitational acceleration, for ground surveys, and of the order of 1 mgal for airborne systems.

The gravity gradient is the variation in the gravitational acceleration as the location is changed by a small distance. The units are thus (m/s$^2$)/m, or s$^{-2}$. It is conventional in geophysical work to use the unit Eotvos =10$^{-9}$ sec$^2$ for the gravity gradient. The short form for Eotvos is Eo. The background vertical gravity gradient ($G_{zz}$) in the vertical component of the gravitational acceleration ($g_z$) is typically 3080 Eo at the surface of the Earth. Sensitivities approaching 1 Eo have been suggested for airborne gravity gradiometry systems for mineral exploration applications.

The following equations can be derived from equation (1) assuming a point mass and assuming a coordinate system where x and y define a horizontal plane. The gravitational acceleration components are:

$$g_x := -M_{XYZ} \cdot G \cdot \frac{\Delta x}{(\Delta x^2 + \Delta y^2 + \Delta z^2)^{\frac{3}{2}}} \quad (4)$$

$$g_y := -M_{XYZ} \cdot G \cdot \frac{\Delta y}{(\Delta x^2 + \Delta y^2 + \Delta z^2)^{\frac{3}{2}}}$$

$$g_z := -M_{XYZ} \cdot G \cdot \frac{\Delta z}{(\Delta x^2 + \Delta y^2 + \Delta z^2)^{\frac{3}{2}}}$$

It should be noted that the equation for $g_z$ will reduce to equation (1) when and are zero and is replaced with r. Further, the following equations can be obtained for the gravity gradient components:

$$G_{xx} := -M_{xyz} \cdot G \cdot \left[ \frac{1}{(\Delta x^2 + \Delta y^2 + \Delta z^2)^{\frac{3}{2}}} - \frac{3 \cdot \Delta x^2}{(\Delta x^2 + \Delta y^2 + \Delta z^2)^{\frac{5}{2}}} \right] \quad (5)$$

$$G_{yy} := -M_{xyz} \cdot G \cdot \left[ \frac{1}{(\Delta x^2 + \Delta y^2 + \Delta z^2)^{\frac{3}{2}}} - \frac{3 \cdot \Delta y^2}{(\Delta x^2 + \Delta y^2 + \Delta z^2)^{\frac{5}{2}}} \right]$$

$$G_{zz} := -M_{xyz} \cdot G \cdot \left[ \frac{1}{(\Delta x^2 + \Delta y^2 + \Delta z^2)^{\frac{3}{2}}} - \frac{3 \cdot \Delta z^2}{(\Delta x^2 + \Delta y^2 + \Delta z^2)^{\frac{5}{2}}} \right]$$

$$G_{xy} := M_{xyz} \cdot G \cdot \left[ \frac{3 \cdot \Delta x \cdot \Delta y}{(\Delta x^2 + \Delta y^2 + \Delta z^2)^{\frac{5}{2}}} \right]$$

-continued $$G_{yz} := M_{xyz} \cdot G \cdot \left[ \frac{3 \cdot \Delta y \cdot \Delta z}{(\Delta x^2 + \Delta y^2 + \Delta z^2)^{\frac{5}{2}}} \right]$$

$$G_{zx} := M_{xyz} G \cdot \left[ \frac{3 \cdot \Delta z \cdot \Delta y}{(\Delta x^2 + \Delta y^2 + \Delta z^2)^{\frac{5}{2}}} \right]$$

where $M_{xxz}$ is the mass of a volume element 20 at a position (X,Y,Z) within solution grid 16. G is the gravitational constant and the values Δx, Δy and Δz represent the components $(x_r-X_i)$, $(y_s-Y_j)$, and $(Z_t-Z_k)$, respectively of equation (3b) above. The terms Δx, Δy and Δz represent the distance from the gravity sensor to the center of mass of the volume element being considered. It should be noted that both x and X in the relation above can vary independently. The subscripts r, s, and t are used to track the location (x,y,z) of the observation point and subscripts i, j, and k are used to track the location (X,Y,Z) of the volume elements.

The parameter most often used to define a gravitational field in geophysics is the magnitude of the gravitational acceleration, and this is typically interpreted to be the same as the vertical component of the gravitational acceleration. For the Earth, the vertical component is always the largest component, and is typically six orders of magnitude larger than the horizontal components. In a local measurement it is practically impossible to distinguish between the vertical component of the gravitational acceleration and the magnitude of the gravitational acceleration. Because of this the term 'vertical' implies 'aligned with the direction of the gravitational acceleration', and this is commonly assumed to be along a line pointing directly towards the center of mass and, also by assumption, the center of geometry. In general neither of these assumptions hold. When large scales of the order of the distance from the poles to the equator are considered, it becomes clear from observations of the stars, that the gravitational acceleration at the surface is not in general parallel to the line through the geometric center of the Earth, nor is it directly exactly towards the center of mass of the Earth. The effect of this is readily observed to cause a precession in satellite orbits.

The vertical gradient of the vertical component of the gravitational acceleration, namely $G_{zz}$, has also conventionally been considered as the most important component of the gravity gradient tensor. Hence the inversion approaches that make use of the gravity gradient typically rely on the vertical gradient, $G_{zz}$, of the vertical component of the gravitational acceleration, $g_z$, and in some cases one or two additional gradient components. This limits the amount of data that is available in the inversions. Moreover, it is the practice to make observations of the gravitational field at one altitude only. This results in inversion approaches (i.e. algorithms for calculating density from measured $g_z$ and/or $G_{zz}$) that are based on insufficient data. With an insufficient number of independent measurements it is not possible to obtain unique solutions.

The above equations for the gravity gradient components clearly show that the variations in each of the gravity gradient components are of approximately the same magnitude, although the pattern for the gravity gradient depends on which component is being considered. Equation (3) above also shows that there are simple symmetries for a point mass. For a point mass it is possible to determine relationships between the components of the gravitational acceleration and the gravity gradients. However, for an arbitrary mass distribution no such relationships exist, and the independence of the components means that five independent gravity gradient terms can be measured at each survey point. The vertical component for the gravitational acceleration can also be measured, making it possible to measure six independent parameters at each survey point.

The system of equations that result from summing the effects of a number of masses (i.e. a number of volume elements) that each produces gravitational acceleration and gravity gradients at various locations along a flight line can be represented as:

$$a = A * M \qquad (6)$$

where a is a generalized vector of gravitational acceleration components (e.g. $g_z(x_1,y_1,z_1)$) and gravity gradient components (e.g. $G_{xx}(x_1,y_1,z_1)$, $G_{xy}(x_1,y_1,z_1)$, etc.), A is a square matrix whose elements represent the relationship between the various components of the gravity gradient or the gravitational acceleration measurable at the survey grid points and the mass of each volume element, and M is a vector of the masses of the volume elements. Elements of the matrix A, can be calculated in a straightforward manner using equations (4) and (5) above. The inverse problem, i.e., that of determining the mass vector, M, from a vector of measured gravitational accelerations and gravity gradients, is written as:

$$M := A^{-1} \cdot a \qquad (7)$$

As can be seen, equations (4) are simply single terms out of the summation equation (3a) for the gravitational accelerations, and equations (5) are the corresponding equations for the individual terms for the corresponding summations for the gravity gradients. Specifically, equation (3a) gives the summed effect of all volume elements building up the gravitational acceleration at point (x,y,z) summed over all the volume elements at locations (X,Y,Z). Therefore, equations (4) and (5) are the equations to be used to compute the individual entries of the matrix A. Specifically, equations (4) and (5) provide the multipliers for the $M_{xyz}$, and these multipliers can be easily calculated once the distance information is known, i.e. the geometrical relationship between the survey points on survey grid 22 and centers of volume elements 20 within the solution volume 16, and represent the elements of the matrix A. For example, for the gravity gradient value $G_{xy}$ the following entry in matrix, A, can be evaluated knowing Δx, Δy, and Δz:

$$G \cdot \left[ \frac{3 \cdot \Delta x \cdot \Delta y}{(\Delta x^2 + \Delta y^2 + \Delta z^2)^{\frac{5}{2}}} \right]$$

Based on the relation a=A*M, and according to basic matrix relations, one row of the A matrix times the masses of the volume elements (20) (i.e. the vector M) corresponds to the summation in equation (3a), which is then an approximation to the integral equation (2a). Also, for each row in the matrix, A will correspond to one observation term (i.e., a gravitational acceleration or a gravity gradient component at one observation grid point). Therefore, if all five gravity gradient components and the vertical gravitational acceleration are measured, there will be six rows in matrix A for each observation grid point.

The matrix A is understandably large implying that a large number of observations are required. For example, and referring again to FIG. 1, if the solution volume 16 (FIG. 1) is defined over a 15 kilometer by 15 kilometer area and to a depth of 2500 meters, and a horizontal and vertical resolution of 250 meters by 250 meters by 250 meters is adopted, there will be 36,000 volume elements 20 within solution volume 16. The A matrix will then be 36,000 by 36,000. Assuming that the survey grid is flown so that observation points are set at the same horizontal grid spacing (which is preferable), there will be 3,600 survey points per horizontal survey plane. With measurement of the vertical component of the gravitational acceleration and all five independent gravity gradient components, there will be six observations per survey point. Accordingly, there will be 21,600 observations per survey plane. Therefore, in this illustrative example, at least two survey planes would be required to compile the necessary data. One survey plane would have 21,600 measurements, the other would have at least 14,400 measurements. Combined, these provide the required 36,000 independent observations that allow the inversion equation (7) to be solved uniquely.

The above example is for illustrative purposes only and assumes constant size for the volume elements rather than taking into account the increase in size of the volume elements with depth that would normally be used in practice. This illustrative solution grid could be used in a situation where the effect of the volume surrounding the solution grid is already known, as may be the case when the current invention is used to refine the density distribution for a previously known distribution, and where the sensors used are capable of resolving the effects of the deepest volume element.

The terms in matrix A depend on the size and depth of the volume elements as well as on the height of the survey plane and accordingly can be calculated independently of the surveyed gravity parameters. The surveyed gravity parameters are measured by flying the survey planes 18 (FIG. 1) and the collection of measured gravity parameters form the vector a in equations (6) and (7). As long as the survey is flown in the same pattern (i.e. the surveyed gravity parameters are in the same configuration in respect of the elements of matrix A), a calculated matrix A can be used repeatedly for different sites. Accordingly, the inverse matrix $A^{-1}$ only needs to be determined once for a particular pattern of flying (i.e. for a particular set of observations along predetermined flight lines 21). However, in practice, it can be desirable to alter the flight height above ground (e.g. if the surface is very hilly or contains other height obstacles), and the number of planes according to the resolution required, and accordingly the matrix A must be recalculated (i.e. with the new values of $\Delta x$, $\Delta y$ and $\Delta z$ that represent the distance from the gravity sensor to the mass-center in equations (4) and (5)).

If each of the gravitational acceleration components, $g_x$, $g_y$, and $g_z$, could be measured with sufficient resolution and accuracy then a more complete inversion would be possible. As already mentioned, the horizontal components of the gravitational acceleration are, however, typically very small, in the order of one-millionth of the vertical component. This makes measurement of these components from a moving platform practically impossible with current technology, as it requires establishing and maintaining the attitude of any platform on which the sensors are mounted to within 0.00006 degree with respect to the Earth's geode. This is beyond current capability for a moving platform. Further, a moving platform will have its own accelerations that will typically far exceed the variations that would need to be detected. Another challenge is that the vertical component of the gravitational acceleration decreases with height by approximately 0.3 mgal per meter. This is comparable to the variations that need to be detected in this component of the gravitational acceleration, requiring that the height of the sensor be determined within a few tens of centimeters. A combination of a global positioning system (GPS) and an inertial navigation system can provide this required accuracy for the height of the sensor.

Referring back to FIGS. 1 and 2, the process steps 100 of the survey method of the present invention begin with the detectable volume element stage 102 where resolution limits of the gravity sensors being used are determined (e.g. 1 Eo for a gradiometer and 1 mgal for a gravimeter) and the number of measurements that will be made at each observation point are determined. Based on the sensor characteristics, the observation points are spaced far enough apart so that the measurements are independent from each other. From practical consideration, it is preferable that the minimum spacing between the observation points substantially matches the resolution of the first (shallowest) layer of solution volume 16 (FIG. 1).

Figure 4:
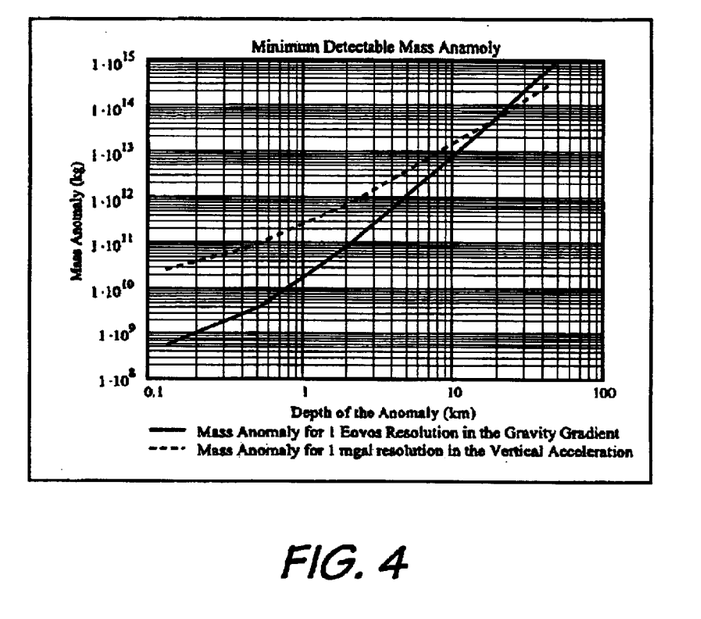
FIG. 4 is a graphical representation of the detectable mass anomaly as a function of depth, from a survey height of 300 meters above ground.
Figure 5:
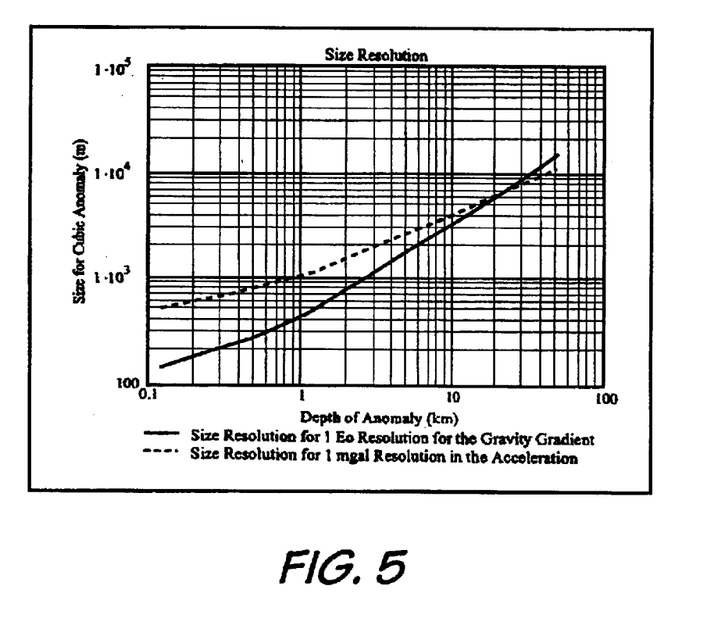
FIG. 5 is a graphical representation of the size resolution corresponding to the mass resolution shown in FIG. 4, for an assumed density resolution of 250 kg/m$^3$.

The size of the smallest detectable cubic volume element that can be detected by the gravity sensors based on various survey particulars is then determined. These survey particulars include the altitude of the survey plane, the minimum mass anomaly that can be detected as a function of depth, the characteristics of the gravity sensors and the selection of density resolution desired for the survey. Known relationships between the detectable mass anomaly and the sensor distance (as shown in FIG. 4 and further described below) and between minimum density anomaly and the size of the volume element that would generate the minimum resolvable signal (as shown in FIG. 5 and further described below) are utilized in this determination.

During survey grid 24 determination stage 104, the area to be surveyed is established. It is preferable for the solution volume 16 (and accordingly the survey area 14) to be square in plan form, although it should be understood that various geometric shapes could be accommodated by the present method. The size of the minimum detectable cubic volume element determined in step 102 is used to build a three-dimensional solution volume 16. Preferably, the flight lines are spaced to match the desired resolution for the layer immediately below the survey area 14 (i.e. the shallowest layer) and the flight lines are typically long enough to provide the survey grid 24 with an area equal in size to the survey area of interest. However, the solution volume will be extended horizontally beyond the survey area, such that the mass of the volume elements at the edge of the volume of interest, i.e. the volume 16 directly below the survey area 14, can be uniquely determined. Also, in step 104, the number of volume elements are determined and the minimum number of observation points are calculated based on the three-dimensional solution volume 16 and the extension just discussed. Also, the minimum number of observation points required is determined based on the total number of volume elements and the number of independent observations actually taken per observation point on the survey grid. The minimum number of planes that need to be flown can be determined based on the number of observation points required, the spacing between observation points along the flight lines, and the spacing between the flight lines.

In step 106, the matrix calculation stage consists of calculating the elements of matrix A, as discussed above. The elements of matrix A can be calculated from the size and the location of volume elements 20, the height of the survey planes 25, and the location of the observation points 22 on the survey planes. Since matrix A is only dependent on the geometry between the volume elements 20 and the observation points 22, the dimensions of volume elements 20 and the height of the survey planes 25, a specific combination of a solution volume 16 and survey grid 24 will have an associated matrix A and can be reused without having to recalculate matrix A. The inverse of matrix A is also determined for future use in relation to equation (7) as discussed above.

In step 108, the survey data gathering stage, the vehicles 18 are flown along survey flight lines 21 over survey area 14 such that the gravity sensors 19 are able to gather the required gravitational data.

In step 110, the solution stage 110 consists of running a computation program to calculate the product of the inverse of the matrix A (calculated above in step 106) and the vector a of gravitational data gathered during the survey data gathering stage in step 108. The result of this calculation is a vector M that contains the three-dimensional mass distribution of the solution volume 16. The three-dimensional density distribution of the solution volume 16 is then determined from the three-dimensional mass distribution of the solution volume 16 and the size of the volume elements.

Accordingly, the survey method of the present invention provides a basis for defining the solution volume 16 (FIG. 1), such that a unique inversion of matrix A for the three dimensional density distribution is possible. As previously discussed, given the resolution of the gravitational sensors 19 (FIG. 1), it is possible to define the solution grid such that the volume elements 20 increase in size as the volume locations increase in depth below the survey plane. The survey grid 24 can then be configured to provide at least the minimum number of survey points such that the total number of independent measured values matches or exceeds the number of volume elements 20. This approach will lead to the definition of a survey grid 24 that typically has two or more survey planes above ground, each with a series of points for the measurements.

Figure 3:
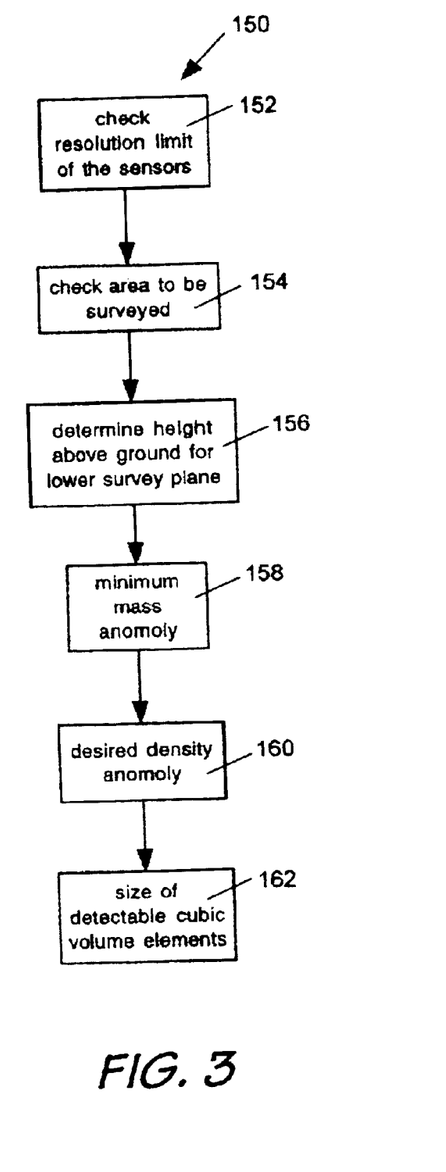
FIG. 3 is a flowchart illustrating the detectable volume element stage of the survey method of FIG. 2.

FIG. 3 provides a flowchart containing more detailed process steps 150 illustrating the detectable volume element stage discussed above when describing FIG. 2. In step 152, the resolution of the gradiometer and the gravimeter (gravitational sensors 19) are determined (in the example, 1 Eo for the gradiometer and 1 mgal for the gravimeter). As is conventionally known, the resolution of the sensor is related to the noise inherent in the sensor output, the distribution of the noise with frequency, i.e., on the power spectral density of the sensor noise signal, and the desired frequency content for the observed signal. At this stage, the number of measurements that will be made at each observation point must also be known. Typically, all five gradient components plus the vertical component of the gravitational acceleration (i.e. $g_z$) will be measured. This approach gives six independent observations per observation grid point. However, it should be understood that the inversion algorithm also works if fewer components are measured. However, with fewer gradient components, more observation points will be required. As discussed, it is important that the observations be spaced far enough apart that the measurements are independent from one another. The determination of observation point spacing within survey grid 24 (FIG. 1) is related to the response time of the sensors 19, the vehicle speed, and to the minimum grid size of volume 16. The spacing between observation points 22 cannot be greater than the solution volume 16 spacing of the layer immediately below the Earth's surface and the response of the sensors 19 must be fast enough to ensure that the measurements at grid points with this spacing are independent, given the flight speed of the survey vehicle 18.

In step 154, the area to be surveyed (assumed to be square in plan view in the example) is established. The flight lines 21 (FIG. 1) are spaced to match the desired resolution for the shallowest layer (as discussed above), and are of a length to match the area of interest, namely the survey area 14. In step 156, the height H above the ground (FIG. 1) for the lower survey plane is set. For an airplane, this will typically be set to be 100 meters or more above the highest obstacle in the survey area 14, although variations are possible and lower altitudes could easily be used, for example if the survey vehicle is a helicopter, or if the terrain allows a lower survey altitude in an airplane.

In step 158, based on the resolution of the gravitational sensors 19 and the minimum survey height H, the minimum mass anomaly that can be detected as a function of depth is determined. FIG. 5 illustrates the relationship between the mass anomaly that can be detected as a function of the distance from the sensor. This relationship is based on the approximation that the distance is primarily the depth of the volume element 20 plus the height above ground of the sensors 19 (i.e. H). This approximation can be refined without changing any important aspect of the invention. In the example presented, based on a survey height of 300 m, and on the resolution of the gradiometer (e.g. 1 Eo) and the gravimeter (e.g. 1 mgal) discussed above, the minimum detectable mass anomaly is determined in step 158 for both the gravimeter and the gradiometer (see dotted and solid lines on the graph in FIG. 5). This detectable mass to depth relationship happens to correspond well with most practical applications, i.e., the deeper one is probing, the larger a deposit has to be to be detected, and out of practical necessity, deeper deposits also have to be larger to be of economic interest. For example, oil and gas structures of economic interest can be much deeper than mineral structures, but the oil and gas structures are typically also much larger. Mineral deposits are generally smaller in volume extent than oil deposits, but only those at shallower depth are economically viable.

Based on the resolution limit, the minimum mass anomaly that can be detected by the gravimeter as a function of the distance from the sensor can be calculated using equation (1). The minimum mass anomaly that can be detected by the gravity gradiometer as a function of the distance from the sensor can be calculated using an equation obtained by taking the derivative of equation (1) with respect to r. Once the minimum mass anomaly has been determined, the desired density resolution is set (e.g. 250 kg/m$^3$) in step 160. In step 162, the size of the volume element 20 is determined for each depth by dividing the minimum mass by the selected density resolution. It should be understood that if a finer density resolution is desired, either the resolution of the sensors would have to be greater, or the size of the volume elements would have to be increased. The selection of the most appropriate density resolution would be done on a case by case basis. In a practical application it is likely that several density resolutions may be used to obtain several complementary solutions.

Figure 6:
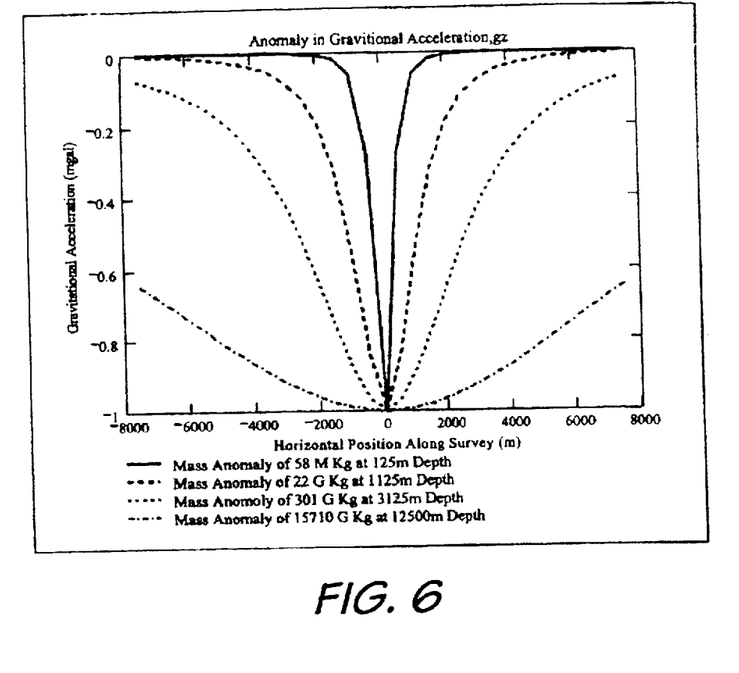
FIG. 6 is a graphical representation of an anomaly in the vertical component of the gravitational acceleration over a point mass anomaly.
Figure 7:
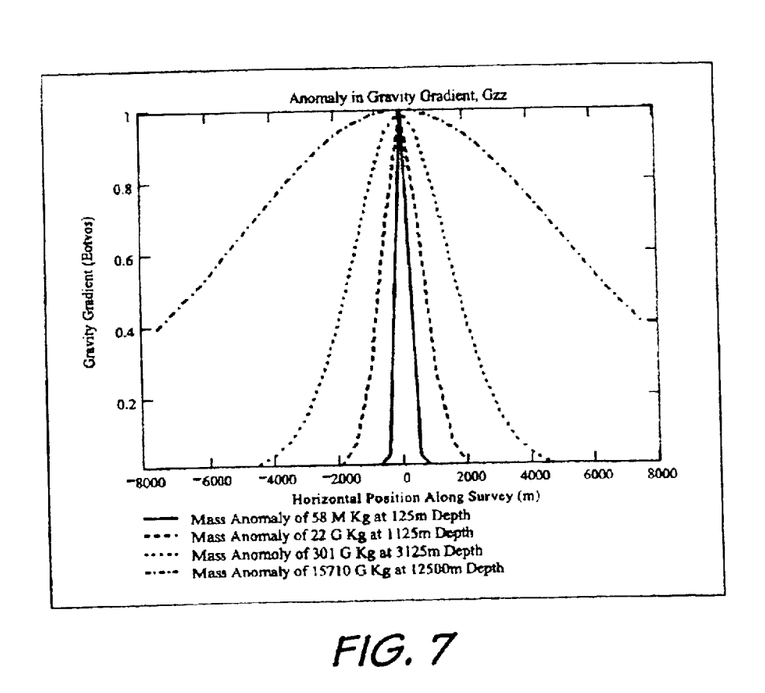
FIG. 7 is a graphical representation of an anomaly in the vertical gradient of the vertical gravitational acceleration over a point mass anomaly.

FIGS. 6 and 7 illustrate the signature (i.e. the variation) in the gravity gradient and gravitational acceleration signal respectively as measured by sensors 19 if these are transported horizontally across a mass anomaly located at various depths below the surface. The mass is set to be the minimum detectable mass for each selected depth. This shows that a shallow mass anomaly will produce a very sharp signal, whereas a deep anomaly will produce a more gradually varying signal. The graphs also show that a mass anomaly at 12.5 kilometers will produce very little variation in the signal as the sensors 19 are traversed across the anomaly, and hence will be barely detectable for a survey line that is only 15 kilometers in length. A deeper mass anomaly will produce even less signal variation and will therefore not be detectable given the 1 mgal and 1 Eo resolution for the gravimeter and gradiometer, respectively, for a survey line 15 km in length. However, a deeper mass anomaly could be detected if a longer survey line is flown.

As discussed above, the resolution limit of the gravitational sensors 19 can be used to limit the solution volume (i.e. the number of volume elements 20 of the solution volume 16), i.e. the graphs of FIGS. 6 and 7 can be used in combination with FIG. 5 which shows the minimum size for a detectable anomaly assuming a density anomaly of 250 kg/M$^3$. Together these relations can be used to define the manner in which the size of the volume elements 20 depend on the depth. Specifically, it has been found to be advantageous to solve for mass (density) anomalies down to a depth where anomalies produce detectable signal changes over a particular length (e.g. 15 km) for a survey flight line 21. If one were to fly a longer survey flight line 21, a deeper anomaly could be detected. Accordingly, the length of the survey flight line 21 and the resolution limit of the sensors 19 determine the depth to which one must apply the inversion algorithm in order to have a unique solution, i.e. a larger survey area will allow for a survey that probes deeper into the Earth.

In summary, the graphs of FIGS. 6 and 7 assist in the proper formulation of the solution volume 16 by allowing a user to determine ahead of time the depth to which it will be possible to effectively sense mass anomalies. If it is desired to sense mass anomalies at a greater depth than that indicated by the relations shown in FIGS. 6 and 7, then the user could adjust the size of the survey grid to improved the detectability of a deeper mass anomaly.

Figure 8:
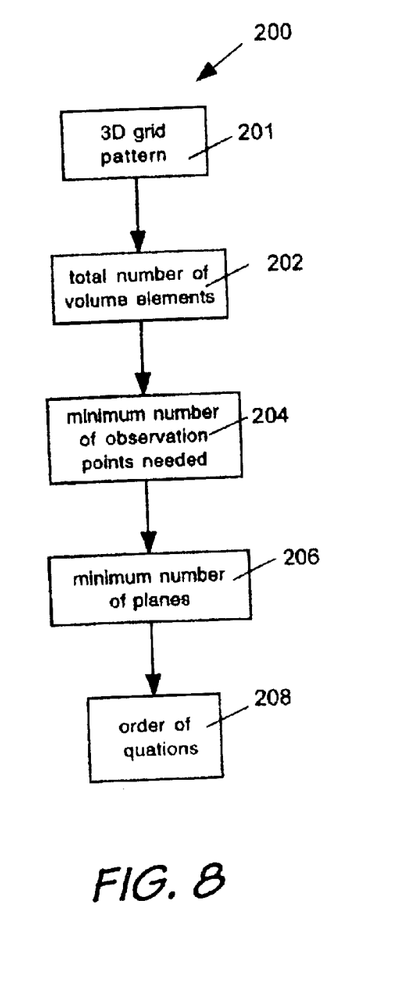
FIG. 8 is a flowchart illustrating the survey grid definition stage of the survey method of FIG. 2.

FIG. 8 provides a flowchart containing more detailed process steps 200 illustrating the observation point grid determination stage discussed above in connection with FIG. 2. In step 201 a determination is made of a three-dimensional grid pattern for the solution volume grid based on the sensor resolution and the selected density resolution. The total number of volume elements 20 is determined in step 202.

Based on the number of volume elements 20 and the number of measurements taken at each observation point 22, the minimum number of observation points required is determined in step 204. In step 206, the minimum number of survey planes 25 that need to be flown is determined, based on the minimum number of observation points required to match or exceed the number of volume elements determined in step 202. Usually the number of survey planes 25 will be no more than two. However, to obtain a finer resolution and in the case of very promising properties, three or more planes 25 may be used. In step 208, the order of the equations is set. It should be understood that there is some arbitrariness here, as the equations may be ordered in a number of different ways. For example, all of the gravitational acceleration terms $g_x$, $g_y$ and $g_z$ may be placed first, then the gradient terms in the order $G_{xx}$, $G_{yy}$, $G_{zz}$, $G_{xy}$, $G_{yz}$, $G_{xz}$. The order is not unique, but there can be practical computational advantages to one over another, as is conventionally known in the field of numerical computing.

Figure 9:
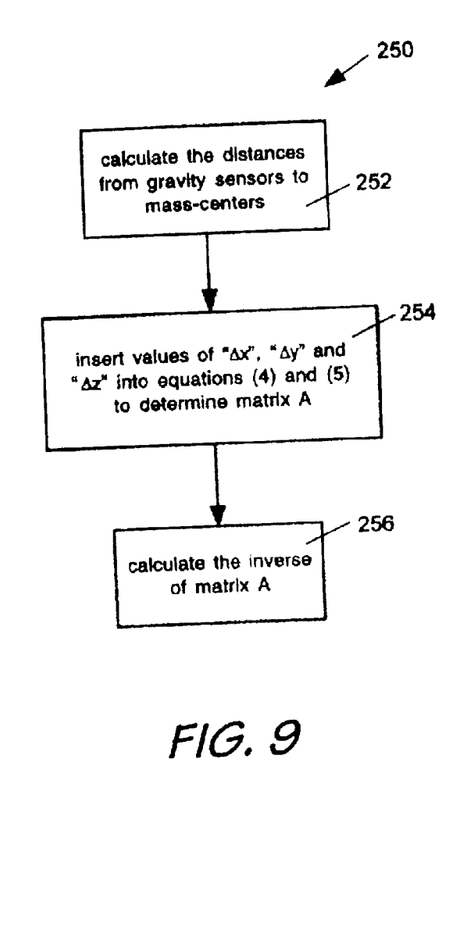
FIG. 9 is a flowchart illustrating the matrix calculation stage of the survey method of FIG. 2.

FIG. 9 provides a flowchart containing more detailed process steps 250 illustrating the matrix calculation stage discussed above in connection with FIG. 2. In step 252, the values of the variables $\Delta x$, $\Delta y$, and $\Delta z$ (i.e. the distances from the gravitational sensors 19 to the mass-center of the various volume elements 20) are calculated using the geometrical relationships that result from the established configuration of the solution volume 16 and the survey grid 24. In step 254, equations (4) and (5) are evaluated by substituting the known distances from the gravitational sensors 19 to the centers of the volume elements 20 of solution volume 16 to calculate the elements in the matrix A. In step 256, the inverse of matrix A, namely $A_{-1}$ is calculated using conventionally known techniques. The entries in matrix A are strictly functions only of the geometry of the solution volume 16, the survey grid 24 and the heights H of the survey planes 18. As discussed, all of the terms in the matrix A can be calculated using equations (4) and (5), with the $\Delta x$, $\Delta y$, and $\Delta z$ values determined from the difference between the centers of the volume elements 20 and the location of the observation grid points 22.

During the survey data gathering stage, the aircraft 18 are flown to collect the required data over the survey area 14. Note that, in general, more data than the minimum required will be obtained in the case where the sensor responses are fast enough to obtain data at finer spacing than the minimum solution grid size (i.e., the size of the uppermost volume elements). As is conventionally known this additional data can be used to set the solution up in a least square sense, rather than a simple matrix inversion, i.e. to replace the inversion step of step 256 with one based on a least square solution.

Figure 10:
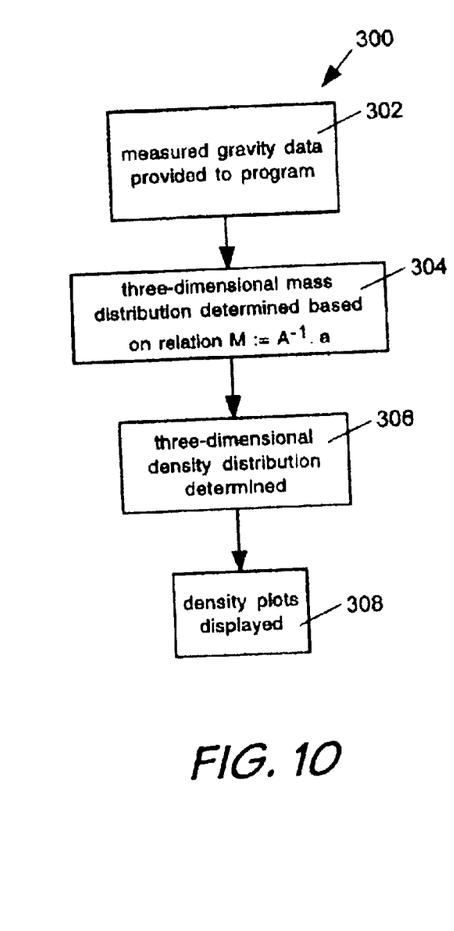
FIG. 10 is a flowchart illustrating the solution stage of the survey method of FIG. 2.

FIG. 10 is a flowchart containing more detailed process steps 300 illustrating the solution stage discussed above in connection with FIG. 2. In step 302, the gravity data measured by the gravitational sensors 19 is provided to a computer program that will solve the matrix problem (i.e. solve equation (7) when $A^{-1}$ and the vector a are known). In step 304, the three-dimensional distribution of the mass M of the volume elements within solution volume 16 is calculated. In step 306, the three-dimensional density distribution is obtained by dividing the individual mass values for the volume elements 20 by the volume of the individual volume elements. Finally, in step 308, the results are presented in three dimensional colour contour plots.

It should be understood that the survey method of the present invention also takes into account the background effect of the Earth. Specifically, the Earth has both an acceleration background (approximately 9.81 m/s$^2$ at the surface) and a gravity gradient background (approximately 3080 Eo at the surface). For a perfectly spherical Earth, the background acceleration is locally exactly vertical, and falls off as R$^2$ and the gravity gradient falls off as R$^3$, where R is the distance from the Earth's center. Since the survey method of the present invention measures local variations in the gravitational field parameters which vary with r$^2$ and r$^3$ where r is the distance from the local density anomalies, the variations will stand out against the variations in the Earth's background. The variations in the Earth's gravity gradient will be small on a scale of 15 km compared to the variations in the gravity gradient signals due to mass anomalies between the surface and 15 km depth. The variation in the vertical component of the gravitational acceleration due to the Earth is also small along level horizontal lines compared to variations due to local mass anomalies. However, the vertical gravitational acceleration due to the Earth will vary with altitude with similar or greater variations compared to variations due to local mass anomalies. Therefore it is essential that the altitude of the survey vehicle be determined to a high degree of accuracy (e.g. on the order of 10 cm or better) in order to correct for the decrease in the background gravitational acceleration with altitude.

Figure 11:
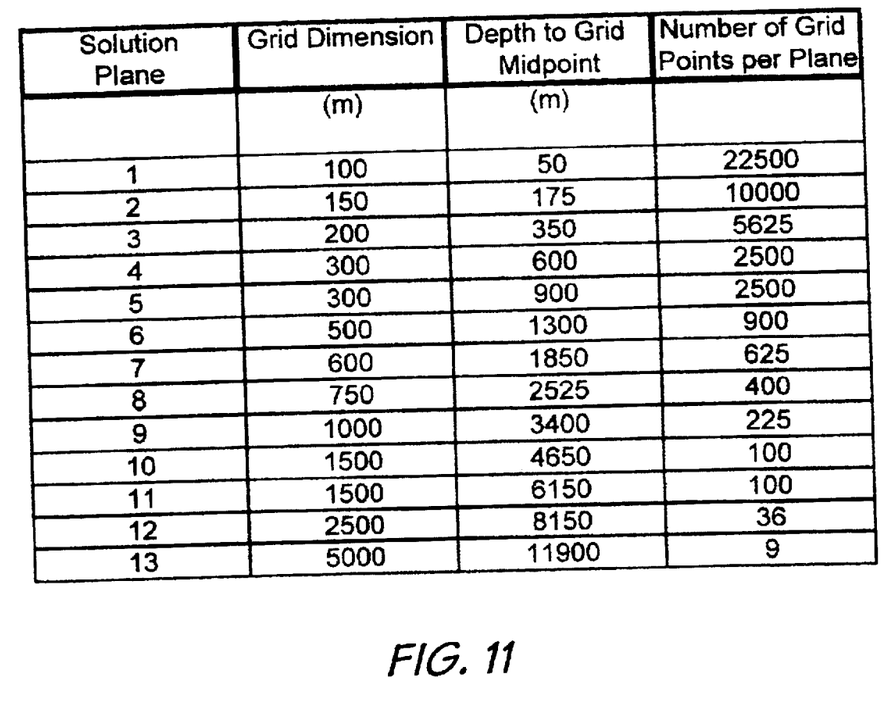
FIG. 11 is a table listing one possible configuration for part of the solution grid of FIG. 1.

FIG. 11 is a table that provides an example configuration for the solution volume 16. The depth to the midpoints for the volume elements 20 is given in the third column, and the number of elements in each plane is given in the fourth column. The total number of volume elements 20 in this example solution volume 16 is 45,520. The first plane of the solution volume is comprised of volume elements 20 that are 100 meters by 100 meters by 100 meters. Their centers are at a depth of 50 meters, and over a 15 kilometer by 15 kilometer survey area 14, there are 22,500 volume elements 20 in the first layer. As indicated by the table elements, each descending solution plane is deeper and has larger volume elements and therefore fewer volume elements.

Figure 12:
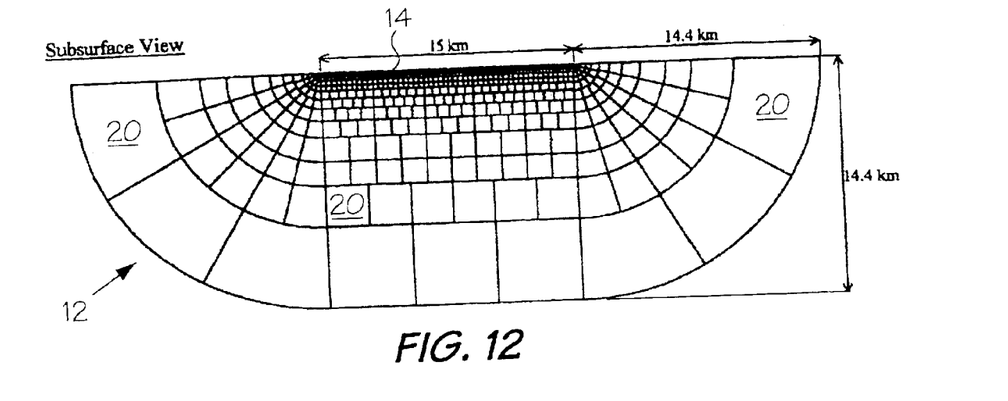
FIGS. 12 and 13 illustrate side and top views, respectively, of the complete solution grid for one practical application, wherein the effects of the surrounding volume are included in the solution.
Figure 13:
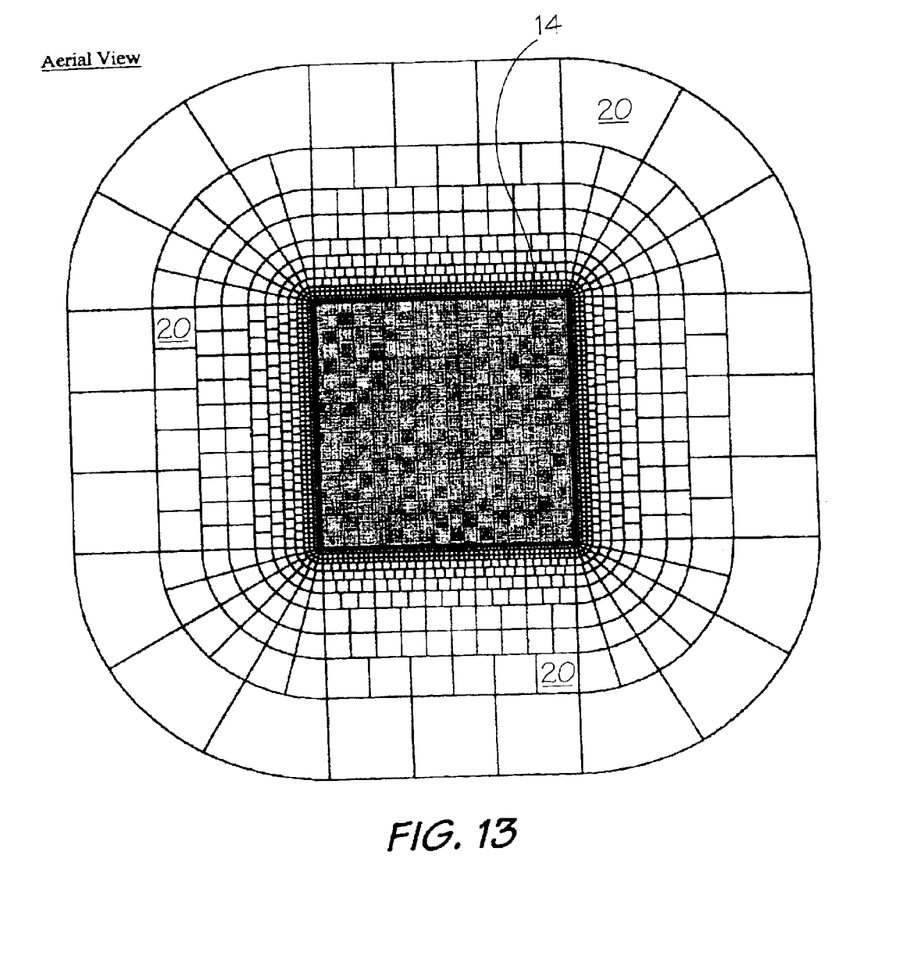

In order to complete the inversion process it is necessary to include means for accounting for the effect of mass anomalies that lie horizontally outside the survey area of interest. Along the edges of the survey area 14 the gravitational parameters can be effected by mass anomalies that lie off to the side of the survey area 14. The effect of these can be included by extending the solution volume horizontally as shown in FIG. 12 (side view of subsurface volume elements) and FIG. 13 (top view). This adds an additional 7528 volume elements to the above example. This requires only that an additional 1255 survey points be added to the survey grid, assuming six observed gravity parameters at each grid point, as has been done in the example. The total number of volume elements will thus be 53,048 for the example. Beyond the volume shown in FIGS. 12 and 13, mass anomalies will produce variations in the gravity parameters that are too small to be observed with 15 km survey lines. FIGS. 12 and 13 therefore show the final configuration of the solution volume for the example. The survey grid will be 15 km by 15 km as discussed. The horizontal extension to the solution volume is 14.4 km in each direction as shown in FIG. 12.

The example solution grid outlined in the table of FIG. 11 provides 100 meter resolution for the shallowest plane, and 1.5 km resolution for the plane at a depth of 4.6 kilometers. Below this depth, the additional solution planes serve to provide proper closure to the inversion. At greater depths, the change in the gravity signals along a 15 kilometer survey line are too small to be detected by sensors with 1 mgal and 1 Eo resolution for the gravimeter and gradiometer respectively.

The inventor has simulated the survey method of the present invention on a computer for a simple case of a vertical plane of dimensions 250 meters by 1000 meters by 1000 meters using a grid spacing of 250 meters. This gives a planar solution grid of four by four volume elements. A survey line with only four survey points was used and only four measured gravity parameters were assumed, $g_x$, $g_z$, $G_{xx}$ and $G_{zz}$. The A matrix was computed using the equations described above to calculate the gravitational parameters. In this case the matrix is 16 by 16. The inverse matrix was computed and used to calculate the density values from the gravitational parameters. The mass anomaly had been set to zero for all except two widely separated volume elements. The returned mass anomalies were in agreement with the set mass distribution to approximately one part in a million.

The above example would allow detection of mass anomalies within volume elements 20 of 250 meters by 250 meters by 250 meters which would be sufficient for some applications. For other applications it may be necessary to define smaller volume elements 20, and to measure the gravitational field at additional survey points.

Generally then, the inversion problem (of equation (7)) can be contained in size since the definition of the volume elements 20 needs to be set by the resolution of the sensors and by the desired density resolution. This leads naturally to defining small volume elements 20 near the surface, and volume elements 20 of increasing size as the depth increase. These should be defined such that a fixed density anomaly generates a nearly constant change in the measured values, independent of the depth of the volume element. The resolution of the sensors used to measure the gravitational field parameters will define the smallest density anomaly that can be detected for a given volume and depth. As shown, this greatly reduces the number of volume elements, and hence the number of survey planes required.

The invention couples several aspects of a gravity field inversion, namely the resolution and sensitivity of the gravitational sensors 19, the number of independent gravity field parameters measured at each survey point (i.e.g., $G_{xy}$, $G_{xz}$, etc.), the number of survey points where the gravitational field parameters are measured within the survey grid 24, the spacing between observation points 22, the number of near-horizontal planes 25 used to establish the observation points, and the horizontal and vertical size of the subsurface volume elements 20 for which the average density can be determined in a unique way. The survey method of the present invention matches the number of independent gravity field parameters measured (i.e. $G_{xy}$, $G_{xz}$, etc.) to the number of volume elements 20 for which the density will be determined. Once a survey pattern is established, the forward matrix (i.e. matrix A) is fixed. From the matrix, a single inversion matrix (i.e. matrix $A^{-1}$) can be determined and can serve many different survey sites which considerably simplifies the implementation of the inversion solution (accordingly to equation (7)) in practical terms.

Since acceleration fields are determined only by the density structures, there is, therefore, no fundamental barrier to determining the density structure uniquely. It is only a matter of making a sufficient number of independent observations of the acceleration field such that the density structure can be determined uniquely for a desired resolution and throughout a solution volume of interest. This is true provided that a limit on the minimum density resolution, for example, setting it at 250 kg/m$^3$ is accepted. If there is no limit set to the density resolution, there is no means for setting the volume element sizes in a unique way. Selection of a density resolution and setting the solution volume consistent with the instrument resolution allows formulation of a unique solution. It should be noted that a solution obtained with one selection for the density resolution will always be consistent with that obtained for another selection. The volume elements 20 may differ in size, but the solutions will be consistent.

Accordingly, the survey method of the present invention is an effective method for performing inversion on gravitational data that insures a unique and proper solution for the density structure of a subsurface region within a solution volume 16. The method involves the collection of sufficient data by first defining the resolution for the density structure such that a unique and correct solution to the well known "inversion problem" is possible. The resolution of the gravitational sensors used to observe the gravitational fields is used along with the selected resolution for the density structure to determine the minimum size of a detectable volume element and a corresponding survey grid configuration. The method also takes into account the background effect of the Earth.

The present invention concerns a methodology and process for relating the measured gravity gradient field and the gravitational acceleration field in a unique way to the three-dimensional mass distribution within a layer that lies from the surface of the Earth to several kilometers below the surface of the Earth. To this date it has been generally understood by practitioners in geophysics that it is not possible to determine in a unique way, the 3-D mass distribution from a survey of the gravitational field parameters, i.e., the from the gravitational acceleration field and/or the gravity gradient field. The present invention provides a methodology that can be used to provide a unique estimate of the 3-D mass distribution at resolutions of commercial interest to the mining and petroleum industries.

Augmentations to the Basic Inversion Methodology

Least Square Method

There are several methods that can be used to improve the basic approach described above. The first, already mentioned above, is to use a statistical approach to formulate the inversion equation (7). This can be done when there are more observations than the minimum required, as described above. The inversion equation (7) can be replaced by the least square inversion equation:

$$M=(A^T A)^{-1} A^T a \qquad (8)$$

In this case, the matrix A is rectangular, since the number of observation points exceed the number of volume elements. This inversion will in general provide improved results, as is well known.

The Layered Solution Approach

Another approach that can be used, independent of the above Least Squares Method or in conjunction with it, to reduce the size of the matrix problem is to define several nested solution volumes, and to run several sequential solutions to build the final solution. For the first run, the solution volume would be segmented into volume elements of constant size based on the deepest volume elements illustrated in FIG. 12. This would result in a very small matrix problem that is readily solved, and would provide the correct mass for all of the large volume elements. For the second run, the mass of the outermost elements is taken as given by the first solution, and volume elements are defined that again are all of uniform size, but now with the size of the second deepest layer shown in FIG. 12. This results in a matrix problem that is only slightly bigger. This run establishes the mass of the second deepest layer, and its extension. The third run uses the now known mass for the outer two layers, and defines volume elements sized to match the size of the third deepest and its extension. This process is repeated until the final layer is resolved. The last run would be a system of 23,104 equations. This approach can be compared to peeling an onion, layer by layer, and is thus referred to as the Peeling method. It has the main advantage that the maximum size of the matrix system is significantly reduced, leading a more stable numerical solution.

Dithering Approach

Another approach that can be used to improve the resolution of the inversion process is to dither the solution. This can be done when there is more than the minimum required number of observation points and when the points allow alternative definition of the observation points to be used. For example, for gravity sensors capable of measuring at 50 m spacing, as is the case for the Gedex Airborne Gravity Gradiometer, (described in WO 02/44757, published Jun. 6, 2002 and incorporated herein by reference) the solution volume can be shifted horizontally in either direction by 50 m, generating two solution grids in addition to the basic grid based on 100 m spacing between the observation points. The solution volume elements will then be shifted in 50 m steps. This allows for refining the resolution of the solution grid, particularly for the shallowest layers. The resolution for the deeper layers can also be improved by dithering with larger steps.

Use of Underground Observations

For the case of existing mines or oil fields where there may be deep mine shafts or deep oil well holes it is possible to augment the above ground observations by obtaining gravitational acceleration and gravity gradient measurements on a traverse down a mine shaft, or along a mined tunnel, or down and along a drilled oil well. Data from such underground surveys can be readily included in the inversion process described herein, and can provide significant improvement to the solutions, since this data will be taken close to resources of interest.

Use of Data From Other Types of Geophysical Instruments

Data from other geophysical instruments can also be used to improve the inversion process, where such data can be related to the subsurface density structure. For example in the case of drill cores, good estimates of the density in local underground regions can be used to add constraints to the solution. Similarly, seismic data can identify the layers where density discontinuities exist. This information can be used to constrain the inversion and improve the process.

Application to Determination of Magnetic Susceptibility

The survey method and system of the present invention is applicable to any measurable geophysical property, and applicable in its complete details to properties that are related to potentials. Thus the method can be used to determine uniquely the three-dimensional distribution of magnetic susceptibility based on measurements of the magnetic field. It is commonly known that the Earth generates a magnetic field. This field varies according to latitude, longitude and altitude. This field is altered according to the distribution of material within the Earth that can be magnetized. Magnetic susceptibility is the measure of how easily material is magnetized and is different for different materials. For example, the magnetic susceptibility for iron is high, while that for quartz if low. The variations in the magnetic field above the Earth's surface will therefore depend on the distribution of such material below the surface. By measuring the variations in the magnetic field and the magnetic gradient, data will be obtained that can be used to determine the three-dimensional magnetic susceptibility.

When carrying out the alternate method in accordance with the invention, the steps are the same as those described above with respect to density distribution determination, except that the sensors are magnetic field and magnetic gradient sensors.

As will be apparent to those skilled in the art, various modifications and adaptations of the structure described above are possible without departing from the present invention, the scope of which is defined in the appended claims.

What is claimed is:

1. A surveying method for determining the subsurface density distribution at a selected resolution for a solution volume below a survey area using an airborne or other type of vehicle containing gravitational sensors for measuring the gravitational acceleration and the gravity gradients, said gravitational sensors having a predetermined resolution, the method comprising:

(a) determining the size of the volume elements at various depths within the solution volume based on the selected sensor resolution, the height of the gravity survey and the predetermined sensor resolution such that the volume of the volume elements times the density resolution equals mass anomalies that are all within the predetermine detector resolution;

(b) determining an observation survey grid above the solution volume comprising observation points, the number of said observation points being sufficient to perform the determination of the subsurface density distribution;

(c) compiling a matrix having elements that relate the gravitational acceleration and gravity gradient values to the mass values of the volume elements; the matrix entries being dependent on the geometries between the location of the volume elements within the solution volume and the location of the observation points within the observation survey grid;

(d) moving the vehicle along a path of travel over the survey area such that the gravity sensors make gravitational measurements at said observation points within the observation survey grid over the survey area at selected altitudes; and (e) based on the gravitational measurements and the inverse of the matrix, calculating values which represent the average density of the volume elements.

2. The method of claim 1, wherein the volume elements are of increasing size as the depth increases within the solution volume.

3. The method of claim 1, wherein the matrix and the gravitational measurements over the survey area are first used to obtain a three-dimensional mass distribution which is then converted into a three-dimensional density distribution using the dimension of the volume elements.

4. The method of claim 1, wherein step (e) includes calculating the average density for each volume element, to provide a three-dimensional density distribution throughout the solution volume.

5. The method of claim 4, including utilizing the three-dimensional density distribution to locate substances located below the survey area.

6. The method of claim 1, wherein the spacing and number of the observation points within at least a portion of the observation survey grid substantially matches the spacing and number of the volume elements within the first layer of the solution volume.

7. The method of claim 1, wherein the length of the survey grid is determined at least in part by determining the gravitational acceleration and gravity gradients a single mass anomaly would generate when measured by the gravity sensors along a single survey line.

8. The method of claim 1, further including obtaining additional measurements of gravitational acceleration and gravity gradients using gravitational sensors positioned below the survey area.

9. A surveying method for determining the three-dimensional, subsurface magnetic susceptibility at a selected resolution for a solution volume beneath a survey area using an airborne or other vehicle containing a magnetic sensor having a predetermined resolution for measuring the magnetic field comprising:

(a) determining the size of volume elements at various depths within the solution volume based on a selected magnetic resolution, the height of the magnetic survey and the predetermined sensor resolution;

(b) preparing an observation survey grid above the solution volume comprising observation points, the number of observation points being sufficient to perform the determination of subsurface magnetic susceptibility distribution;

(c) compiling a matrix having entries dependent on the geometries between the location of volume elements within the solution volume and the location of the observation points in the observation survey grid;

(d) moving the vehicle along a path of travel over the survey area such that the magnetic sensors make magnetic field and magnetic gradient measurements at said observation points within the observation survey grid; and (e) based on the magnetic field and magnetic gradient measurements and the inverse of the matrix, calculating values which represent the volume magnetic susceptibility of the volume elements.

10. The method of claim 9, wherein step (e) includes calculating the average magnetic susceptibility for each volume element to provide a three-dimensional magnetic susceptibility distribution throughout the solution volume.

11. The method of claim 10, including the step of utilizing the magnetic susceptibility distribution to locate substances below the survey area.

12. The method of claim 9, wherein the spacing and number of the observation points within at least a portion of the observation survey grid substantially matches the spacing and number of the volume elements within the first layer of the solution volume.

13. The method of claim 9, wherein the length of the survey grid is determined at least in part by determining the magnetic susceptibility of a single mass anomaly when the magnetic field is measured by the magnetic sensor along a single survey line.

14. The method of claim 9, further including the step of obtaining additional measurements of the magnetic field and using magnetic gradient and magnetic field sensors positioned below the survey area.

15. A surveying system for determining the subsurface density distribution at a selected resolution of a solution volume below a survey area, said system comprising:

(b) a volume determining module for determining the size of the volume elements at various depths within the solution volume based on the selected density resolution, the height of the gravity survey and the predetermined sensor resolution such that the volume of the volume elements multiplied by the density resolution equals mass anomalies that are all within the predetermined sensor resolution;

(c) an observation survey grid module for defining an observation survey grid above the solution volume comprising observation points, the number of said observation points being sufficient to perform the determination of the subsurface density distribution, such that when the vehicle is flown along a flight path the gravitational sensors are adapted to make measurements of the gravitational acceleration and the gravity gradient at said observation points within the observation survey grid over the survey area at selected altitudes;

(d) a matrix module for compiling a matrix having elements that relate the gravitational acceleration and gravity gradient values measured by the gravity sensors to the mass values of the volume elements; the matrix entries depend on the geometries between the location of the volume elements within the solution volume and the location of the observation points within the observation survey grid; and (e) a calculation module for calculating values which represent the average density of the volume elements based on the gravitational acceleration and the gravity gradients and the inverse of the matrix.

16. The system of claim 15, wherein the gravity sensors include gravity gradiometers.

17. The system of claim 15, wherein the gravity sensors include a gravimeter.

18. The system of claim 15, wherein the calculation module is adapted to calculate the average density for each volume element and to calculate a three-dimensional density distribution throughout the solution volume.

19. The system of claim 18, wherein the calculation module is adapted to utilize the three-dimensional density distribution to locate substances located below the survey area.

* * * * *